(12) United States Patent
Koelsch et al.

(10) Patent No.: US 6,439,256 B2
(45) Date of Patent: Aug. 27, 2002

(54) SWITCHABLE FLAP VALVE

(75) Inventors: Lothar Koelsch, Wilnsdorf (DE);
Hans-Gerhard Kogler, Wetzlar (DE);
Gerhard Kranz, Wetzlar (DE);
Christoph Metz, Wetzlar (DE); Frank Schroeter, Moosburg (DE);
Hans-Joachim Faulstroh, Schmiechen (DE)

(73) Assignees: Leica Camera AG, Solms (DE);
Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/728,057

(22) Filed: Dec. 4, 2000

(30) Foreign Application Priority Data

Dec. 4, 1999 (DE) .......................... 199 58 572

(51) Int. Cl.$^7$ .......................... F16K 17/40; B60R 21/26
(52) U.S. Cl. .................... 137/68.13; 137/527; 137/843; 280/736; 280/742
(58) Field of Search ............................ 137/68.11, 68.13, 137/527, 843; 280/730.1, 735, 736, 737, 742, 743.1

(56) References Cited

U.S. PATENT DOCUMENTS

| | | | |
|---|---|---|---|
| 3,861,712 A | * 1/1975 | Matsui et al. | 137/68.13 |
| 5,603,526 A | * 2/1997 | Buchanan | 280/739 |
| 5,695,214 A | * 12/1997 | Faigle et al. | 137/68.13 |
| 5,853,192 A | * 12/1998 | Sikorski et al. | 280/732 |
| 5,899,494 A | 5/1999 | Lane, Jr. | 280/739 |
| 5,918,901 A | 7/1999 | Johnson et al. | 280/739 |
| 6,241,279 B1 | * 6/2001 | Ochiai | 280/735 |

FOREIGN PATENT DOCUMENTS

| | | |
|---|---|---|
| DE | 2 324 571 | 11/1973 |
| DE | 197 04 501 | 8/1997 |
| EP | 0 536 677 | 1/1997 |
| EP | 0 800 967 | 10/1997 |
| EP | 0 917 994 | 5/1999 |
| GB | 2 306 406 | 5/1997 |
| GB | 2 328 649 | 3/1999 |
| JP | 6-305392 | 11/1994 |

\* cited by examiner

*Primary Examiner*—Michael Powell Buiz
*Assistant Examiner*—Ramesh Krishnamurthy
(74) *Attorney, Agent, or Firm*—Crowell & Moring LLP

(57) ABSTRACT

A switchable flap valve having at least one valve plate (2, 2*a*, 2*b*) disposed for pivoting about a longitudinal axis in a housing part (1) for opening or closing a valve opening (11) provided in the housing part (1) in which a strip element (4, 4*a*, 4*b*) is formed on the upper side of the valve plate (2, 2*a*, 2*b*) aligned parallel to the longitudinal axis of the valve plate. The surface of the strip element (4, 4*a*) is inclined toward an adjacent housing wall (20) or toward a second strip (4*b*) and forms a hollow channel with the housing wall (20) or with the strip (4*b*). The free longitudinal edge (18) of the strip (4, 4*a*, 4*b*) is held in a latch mechanism (7, 8) to maintain the valve plate (2, 2*a*, 2*b*) in the closed position. In the housing part (1) at least one opening (13) communicating with one end of the hollow channel is provided, which also is in communication with a pressure generator (14) whose actuation introduces pressure into the hollow channel and elastically deforms the strip elements (4, 4*a*, 4*b*) to release the strip elements from the holders or latches (7, 8) so that the valve plate (2, 2*a*, 2*b*) can pivot to the open position.

17 Claims, 3 Drawing Sheets

SWITCHABLE FLAP VALVE

BACKGROUND OF THE INVENTION

The invention relates to a switchable flap valve with at least one valve plate disposed in a housing part so as to pivot about a longitudinal axis in order to close a valve opening provided in the housing part.

Flap valves are used, for example, for controlling the internal pressure of gas-filled containers. One special application is in impact cushions or so-called air bags for the protection of passengers in a motor vehicle. Such air bags are attached with their open edges to a fixed base which contains a rapidly actuatable gas generating unit for filling the air bag and is affixed to the vehicle. The amount of gas delivered to the air bag can basically be controlled through the gas generating unit. This, however, involves great technical complications. In addition to the given amount of gas and the given capacity of the air bag, and many other parameters, the resultant filling pressure depends also on temperature. On the other hand, the filling pressure is critical to the protective action on the body colliding with the air bag, and the optimum filling pressure depends also on the weight of the body to be protected, and on its velocity at impact. Therefore, there has been no lack of attempts to make the filling pressure of the air bag adjustable both for temperature and for different impacting masses.

GB 2,328,649 A discloses forming defined areas of reduced resistance to rupture in the fabric of the air bag. Upon reaching a predetermined internal pressure, these areas burst, so that a suitable average cushioning of the impacting body is achieved, but this does not take into account individual body weights and accelerations on impact. The bursting performance depends on temperature and on the combination of materials, and is not under time control.

A comparable principle is described in U.S. Pat. No. 5,899,494, in which the bursting areas are defined by a fuse cord intended to open areas of the housing as pressure discharge ports. The activation of the fuse cord is controllable as to time and for different areas, but the melting or burning action in the housing is delayed and uncontrolled. The generation of heat must be carefully controlled in order to avoid other kinds of destruction of the bag fabric. Since on the other hand the burned-out housing part must open reproducibly, the firing power is generally designed to be slightly greater than is necessary for melting through the bag.

EP 0 917 994 discloses providing in the air bag a discharge opening whose cross section is made adjustable by means of a loop arrangement in inverse proportion to the actual internal pressure. Here, too, it is not possible to achieve any time related or acceleration related control of the opening cross section. Only certain areas of the air bag are suitable for positioning and attaching the loop arrangements, which limits the choice of material and the way in which the air bag can be folded.

In EP 0 536 677 B1 and EP 0 800 967, valve arrangements are described, which consist of a slide valve system which is arranged on the base for the air bag. A series of ports opening outward are covered by slide valves which can be pushed out of the covering area by a lever mechanism or a motor drive. The lever mechanism is controlled according to temperature. It is sluggish and requires many mechanical parts. The same applies to the motor drive.

A comparable slide valve system is disclosed in GB 2,306,409 A. Around the inflow opening of the gas generator a rotatable segmented diaphragm is disposed from which the excess gas from the inflation of the air bag can escape. Alternatively, an iris diaphragm can be provided to provide a variable opening cross section. A pyrotechnical piston and cylinder system can be provided to drive the covering means. The mechanical cost of the rotary drive and the guidance of the covering means is very high here, as well.

DE 2 324 571 A1 discloses a flap valve affixed to the air bag base, which is resiliently linked to the base body and produces a variable exhaust port depending on the internal pressure of the air bag.

SUMMARY OF THE INVENTION

It is the object of the invention to provide a valve system which can be activated according to the body weight of the occupants of the vehicle, the intensity of the collision and the timing of the impact.

Another object of the invention is to provide an air bag valve system which operates independently of temperature.

It is also an object of the invention to provide an air bag valve system which produces a reproducible opening cross section with great reliability and speed.

Another object of the invention is to provide an air bag valve system which can be constructed with little mechanical complexity and requires less space for installation.

These and other objects of the invention are achieved by providing a switchable flap valve comprising at least one valve plate pivotably mounted in a housing part so that the valve plate can pivot about a longitudinal axis to open or close a valve opening in the housing part, wherein each valve plate carries a resiliently deformable strip element aligned parallel to the longitudinal axis of the valve plate on one side thereof, the strip element having a lateral face which faces an adjacent housing wall or a similar face of a strip element on a second valve plate, and the strip element forming a hollow channel with the adjacent housing wall or strip element face, a latch mechanism which holds a free longitudinal edge of the strip element such that the valve plate is secured in a position in which the valve opening is closed, a pressure generator in communication with at least one end of the hollow channel such that actuation of the pressure generator releases a pressure wave into the hollow channel which deforms the strip element and releases the strip element from the latch mechanism so that the at least one valve plate can pivot to a position in which the valve opening is open.

Due to the design of the flap structures which can turn from a closed position to an open position, it is assured that the desired opening cross section will be reliably established. The strip elements arranged on the valve plate make locking and unlocking possible in a simple manner by resilient deformation. The inclined arrangement of the strip elements in order to form a hollow channel makes it possible to achieve contactless actuation of the valve flaps. The valve flaps can be journaled directly in the bottom of the base for the air bag, so that only the catches for the latch mechanism and the gas generator affect the structural height. The small number of working elements and their simple shape also especially permit the entire flap valve to be produced as a one-piece injection molded part which can be disposed over corresponding openings in the base body. The cross section of the opening can be adapted for individual body weight and impact time requirements by means of a plurality of such individually activated valve flaps.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
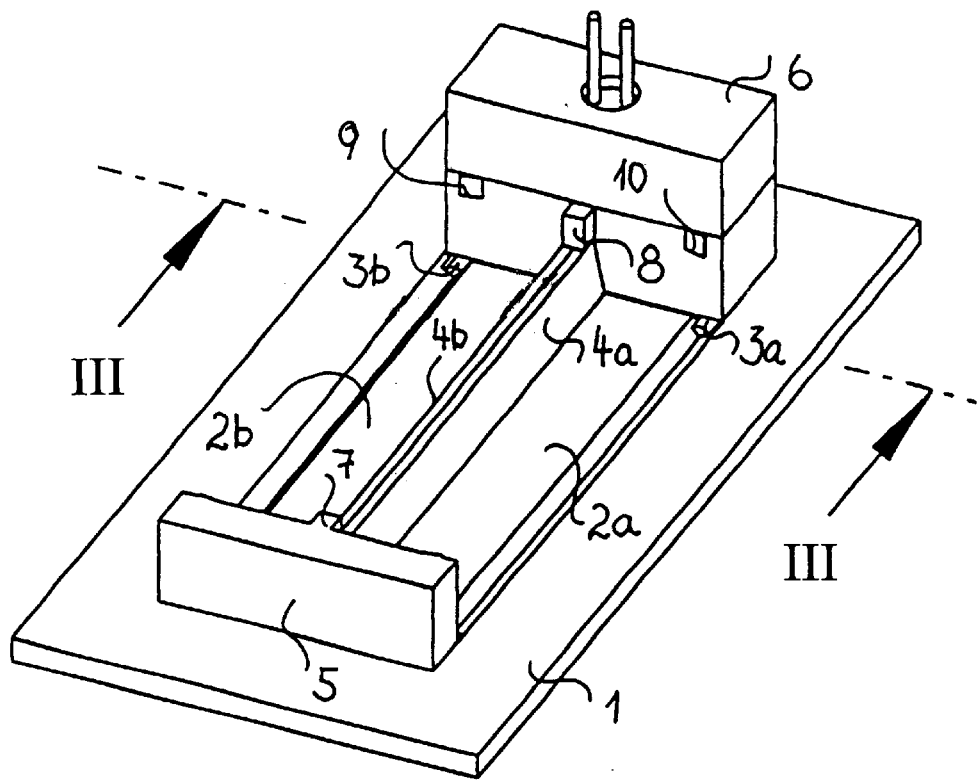
FIG. 1 shows a perspective view of a two flap system in the closed state.

FIG. 1 shows a housing part 1 which here is part of a base for an air bag which is not shown. Two valve plates 2a and 2b close an opening provided in the housing part 1. The valve flaps 2a and 2b are pivotably mounted at their outer longitudinal edges by pivot pins 3a and 3b in the housing part 1.

Strip elements or flanges 4a, 4b which are inclined toward one another, are disposed on the longitudinal edges of the valve plates 2a, 2b at the center of the opening. At the ends of the strip elements 4a, 4b, cam-shaped latch projections 7, 8, are provided on a housing wall 5, 6, which hold the strip elements 4a, 4b in a position in which the valve plates or flaps 2a, 2b are closed. Due to the alight inclination of the strip elements 4a, 4b, which preferably form an angle of 70 to 80° with the plane of the valve plate, the strips rigidly resist a pressure acting on the valve flaps 2a, 2b from the direction of the valve opening, so that the valve opening remains securely closed against unintentional opening after the inflation of an air bag.

Figure 2:
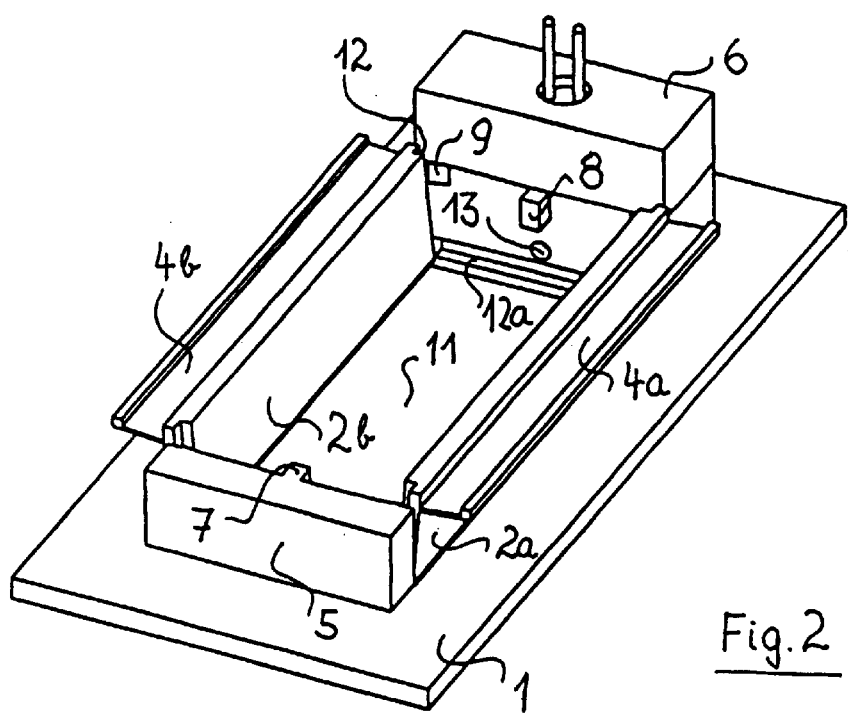
FIG. 2 shows the two flap system of FIG. 1 in the open state.

Additional projections or cams 9, 10, are provided on the housing walls 5, 6, which serve to hold the valve plates 2a, 2b, in the open position, as shown in FIG. 2. In this figure, the previously closed valve opening 11 can be seen. The valve flaps 2a, 2b are provided at the ends with abutments 12 which in the closed position lie upon mating abutments 12a in housing part 1. The strip elements 4a, 4b are slightly offset from the free edges of the valve flaps 2a, 2b, and in this embodiment they have at their upper margin two noses or protuberances directed toward one another which can advantageously overlap one another in order simultaneously to assure that the two valve flaps are both held in the closed position. It is also possible, however, to omit the noses or protuberances so that the longitudinal edges of the strips lie directly against one another. This may be advantageous in the embodiment described below involving a one-piece injection molded part. Underneath the holding cam or projection 8 an opening 13 can be seen, which when the valve is closed is situated opposite the hollow channel between the strip elements 4a, 4b, as shown in FIG. 3.

Figure 3:
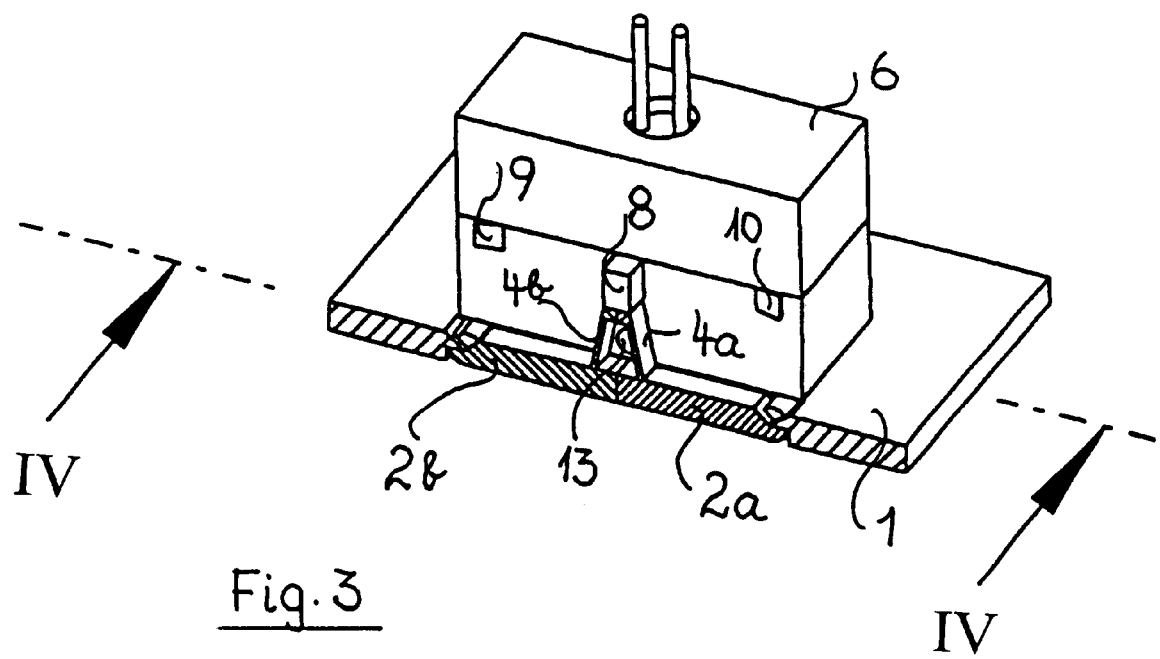
FIG. 3 shows a sectional view along line III—III of FIG. 1 in the area of the latch and the pressure inlet opening for operating the valve flaps.

FIG. 3 shows a sectional view in the area of the holding projection 8, taken through the flanges 4a, 4b, which are inclined toward one another and which form a hollow channel with a trapezoidal cross section. If the enlarged noses or protuberances are omitted, a triangular cross section will evidently result.

Figure 4:
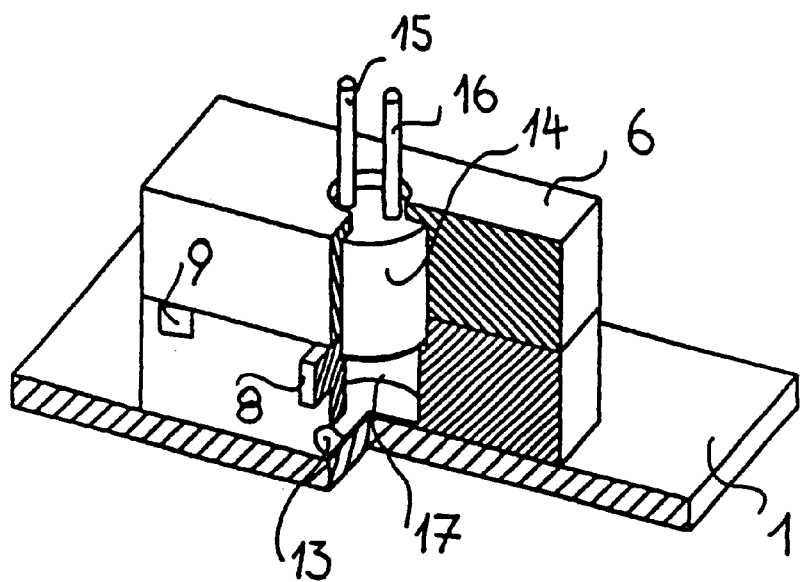
FIG. 4 shows a sectional view of the arrangement of the pyrotechnic actuator element taken along line IV—IV of FIG. 3.

FIG. 4 is a sectional representation inside the housing wall 6 in which a pressure generator 14 is incorporated. The pressure generator 14 is a pyrotechnic system which can be ignited by an electronic control system, not shown, through terminals 15, 16. The portion of the housing wall 6 which contains the pressure generator 14 is preferably made of metal. The volume of gas produced by ignition of the pressure generator 14 initially accumulates in the cavity 17 and is forced through the opening 13 into the hollow channel between the strip elements 4a, 4b. The strip elements thus are forced apart and released from the holding projections 7, 8. The shape of the hollow channel assures that a component of force acting on the flanges will accelerate the valve flaps toward the open position. This is an important element in the operation of the flap valve. If at this moment the air bag is also being filled, the gas flowing out through the valve opening 11 additionally supports the opening movement. To preserve the resulting open cross section, holding cans or projections 9, 10 prevent the valve flap from falling back to the closed position. The holding cams 9, 10 may be formed of a resilient synthetic resin material and can have a spherical shape, so that the valve flaps can slip past the holding cams during the accelerated opening movement, but will be stopped by holding cams if the valve flaps attempt to fall back toward the closed position. It is also possible, however, to configure the holding cams or projections as spring catches which are forced back into corresponding recesses in the housing wall when the valve flaps swing up, and then snap back out again to block the valve plates from pivoting back to the closed position. Of course, such a spring catch can also be integrated into the valve flap so that it springs forward after passing the edge of the housing wall 5, 6, and then catches against the housing wall so as to prevent the valve flap. from falling back to the closed position.

Figure 5:
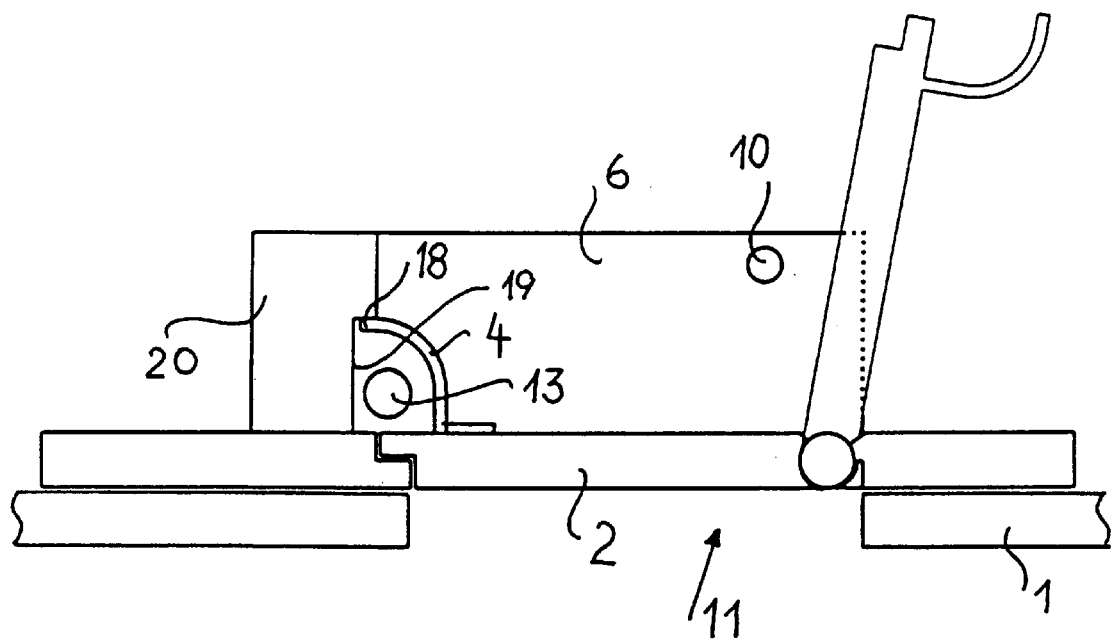
FIG. 5 shows a single flap arrangement.

FIG. 5 shows a single flap arrangement as a complete flap valve component which can be installed over a valve opening 11 provided in a base 1 for an air bag. In this case, the strip element 4 disposed on the valve flap 2 is in the form of a curved strip, e.g., parabolically curved strip, which is attached to the valve flap 2 via a backwardly bent foot. The upper longitudinal edge 18 of the flange element 4 engages a recess or undercut 19 in a housing wall 20 lying opposite the strip element 4. A pressure wave entering through the opening 13 deforms the strip element 4, so that it is released from the undercut 19 and the valve flap 2 is accelerated to the open position, which is also illustrated in the drawing, in which it is held by the holding cam 10 against falling back in to the closed position. To achieve greater stiffness against the internal pressure from a filled air bag it is desirable to make the strip element 4 in the form of a flat surface with as little inclination as possible relative to the valve flap 2 and to arrange the strip element closer to the margin of the valve plate. The could result, however, in too narrow a cross section for the hollow channel. In such a case it is possible to integrate the hollow channel in the housing wall 20 opposite the flange 4 in the form of a suitably configured groove or a substantially deeper recess in the housing wall 20. By providing an appropriately shaped groove above the plane in which the axis of rotation of the valve flap lies, the unlatching and simultaneous acceleration of the valve plate into the open position can be advantageously influenced.

Figure 6:
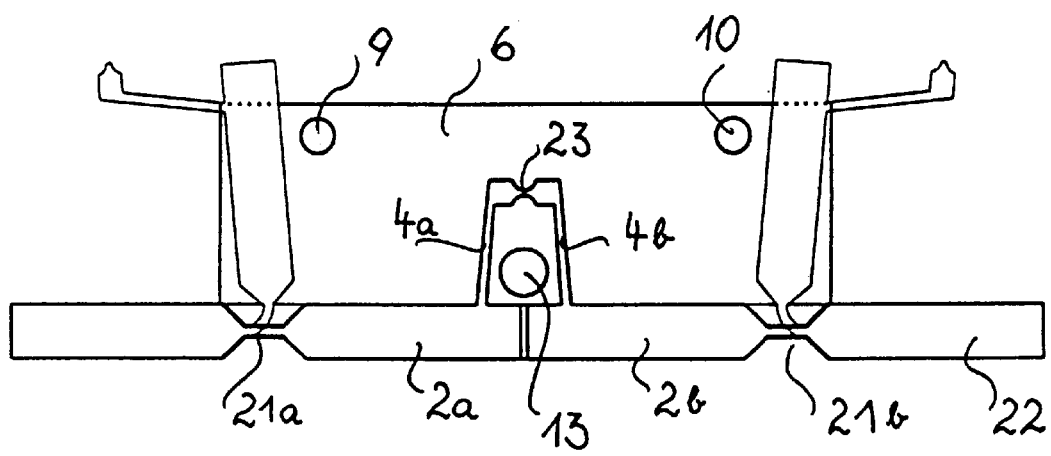
FIG. 6 shows a two flap arrangement in the form of a one-piece injection molded synthetic resin part.

FIG. 6 shows an embodiment of a dual flap system which can be manufactured from a suitable synthetic resin material by injection molding. The valve flaps 2a, 2b, are joined by flexible webs 21a, 21b, to a base plate 22. The strip elements 4a, 4b formed thereon have the shape shown in FIGS. 1 to 3 to form a trapezoidal hollow channel and are joined to one another at the abutting noses or protuberances by a web 23 of reduced material thickness. A separate holding cam or projection can then be omitted. The holding power of the web 23 withstands a pressure acting from below on the valve flap, since only a uniform tension force is exerted perpendicular to the web 23 along its entire length. But when a pressure wave is introduced through the opening 13, locally different rupture forces act during the propagation of the pressure wave which result in the breaking apart of the flanges 4a, 4b. This action can be optimized by providing suitable perforations in the web 23. Moreover, it is possible to produce the pressure propagation not just from one end, but in opposite directions through openings at both of the ends of the hollow channel. The colliding pressure fronts will certainly lead to a sufficient deformation of the flange elements 4a, 4b, which releases them from their mutual attachment or latching to one another.

The flap valves described above can be produced for various opening cross sections and can be used in corresponding valve openings. The electronically triggered pressure generation assures the individual, reliable and rapid opening of the flap valve. By means of appropriately timed combinations of flap valves to be activated, a total opening cross section individually adapted to changing occupants of a vehicle and to different accident situations can easily be preselected, even during the cushioning action, to produce in case of necessity an optimum impact behavior of the inflated air bag. By means of a time-controlled activation of individual valve flaps, the cushioning action can also be controlled in case of a multiple rebound.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A switchable flap valve comprising at least one valve plate pivotably mounted in a housing part so that the valve plate can pivot about a longitudinal axis to open or close a valve opening in said housing part, wherein each valve plate carries a resiliently deformable strip element aligned parallel to the longitudinal axis of the valve plate on one side thereof, said strip element having a lateral face which faces an adjacent housing wall or a similar face of a strip element on a second valve plate, and said strip element forming a hollow channel with the adjacent housing wall or strip element face, a latch mechanism which holds the lateral face of said strip element such that the valve plate is secured in a position in which the valve opening is closed, a pressure generator in communication with at least one end of said hollow channel such that actuation of said pressure generator releases a pressure wave into said hollow channel which deforms the strip element and releases the strip element from the latch mechanism so that the at least one valve plate can pivot to a position in which the valve opening is open.

2. A switchable flap valve according to claim 1, wherein at least a portion of said hollow channel is formed by a groove in said housing wall disposed opposite said strip.

3. A switchable flap valve according to claim 1, wherein the valve plate is pivotably mounted to said housing part by means of pivot pins.

4. A switchable flap valve according to claim 1, wherein said valve plate is pivotably joined in one piece to the housing part by an integral, flexible web.

5. A switchable flap valve according to claim 1, wherein the strip element on the valve plate is disposed at an angle of inclination toward the free edge of the plate of about 70 to 80°.

6. A switchable flap valve according to claim 1, wherein said hollow channel has a parabolic cross sectional configuration.

7. A switchable flap valve according to claim 1, wherein said hollow channel has a trapezoidal cross sectional configuration.

8. A switchable flap valve according to claim 1, wherein the latch for the strip comprises a holding projection mounted on the housing wall facing the hollow channel.

9. A switchable flap valve according to claim 1, wherein the latch for the strip comprises an undercut in the housing wall opposite the strip.

10. A switchable flap valve according to claim 1, wherein the valve opening is closed by two valve plates each of which carries a respective strip, and the two strips are inclined toward one another, and wherein the latch mechanism includes a web that is integral with the two strips and joins the two strips along their longitudinal edges, and the integral web tears apart when the pressure generator is actuated.

11. A switchable flap valve according to claim 1, further comprising holding projections formed on the housing part for holding the valve plate in the open position.

12. A switchable flap valve according to claim 1, wherein the valve plate and the associated strip comprise a one-piece injection molded synthetic resin part.

13. A switchable flap valve according to claim 1, wherein the housing part, the valve plate and the strip together comprise a one-piece injection molded synthetic resin component.

14. A switchable flap valve according to claim 1, wherein the pressure generator is associated with each end of said hollow channel.

15. A switchable flap valve according to claim 1, wherein the pressure generator is an electrically actuated pyrotechnic gas generator.

16. In an air bag which can be filled with gas to protect riders in a vehicle, the improvement comprising a switchable flap valve according to claim 1.

17. A switchable flap valve according to claim 16, wherein a plurality of valve plates are provided which are switchable independently of one another.

* * * * *